(12) United States Patent
Robinson

(10) Patent No.: US 12,463,949 B2
(45) Date of Patent: Nov. 4, 2025

(54) METHOD FOR DISTRIBUTING SECURE DATAGRAMS

(71) Applicant: Stratus Technologies, Inc., Maynard, MA (US)

(72) Inventor: Herbert Robinson, Newton, MA (US)

(73) Assignee: Penguin Solutions Corporate (DE), Maynard, MA (US)

( * ) Notice: Subject to any disclaimer, the term of this patent is extended or adjusted under 35 U.S.C. 154(b) by 444 days.

(21) Appl. No.: 17/691,640

(22) Filed: Mar. 10, 2022

(65) Prior Publication Data

US 2023/0291721 A1    Sep. 14, 2023

(51) Int. Cl.
H04L 69/22    (2022.01)
H04L 9/40    (2022.01)

(52) U.S. Cl.
CPC .......... *H04L 63/0485* (2013.01); *H04L 69/22* (2013.01)

(58) Field of Classification Search
CPC . H04L 63/0485; H04L 69/22; H04L 63/0428; H04L 63/164
See application file for complete search history.

(56) References Cited

U.S. PATENT DOCUMENTS

| | | |
|---|---|---|
| 6,355,991 B1 | 3/2002 | Goff et al. |
| 6,633,996 B1 | 10/2003 | Suffin et al. |
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |

(Continued)

FOREIGN PATENT DOCUMENTS

| | | | |
|---|---|---|---|
| CN | 104283786 A | * 1/2015 | ......... H04L 47/2483 |
| CN | 113553103 A | * 10/2021 | |

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.

(Continued)

*Primary Examiner* — Atique Ahmed
(74) *Attorney, Agent, or Firm* — K&L GATES LLP

(57) ABSTRACT

A first computational device, connected over a network to a second computational device, generates unique datagram distribution information and places it into an unencrypted portion of a plurality of secure IP datagrams comprising a first stream, and sends the plurality of secure IP datagrams over the network to the second computational device. The second computational device is configured to examine each one of the plurality of the secure IP datagrams for the unique datagram distribution information, and uses the unique datagram distribution information to distribute all of the plurality of the secure datagrams to a first one of a plurality of CPU cores comprising the second computational device.

18 Claims, 4 Drawing Sheets

(56) References Cited

U.S. PATENT DOCUMENTS

| | | |
|---|---|---|
| 6,928,583 B2 | 8/2005 | Griffin et al. |
| 6,948,010 B2 | 9/2005 | Somers et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,228,861 B1 * | 7/2012 | Nix ............... H04L 65/1069 370/329 |
| 8,234,521 B2 | 7/2012 | Graham et al. |
| 8,271,416 B2 | 9/2012 | Al-Biek et al. |
| 8,312,318 B2 | 11/2012 | Graham et al. |
| 8,381,012 B2 | 2/2013 | Wiebe |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 10,360,117 B2 | 7/2019 | Haid et al. |
| 11,288,143 B2 | 3/2022 | Horvath et al. |
| 11,586,514 B2 | 2/2023 | Pawlowski et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2008/0126559 A1 * | 5/2008 | Elzur ............... H04L 69/08 709/232 |
| 2009/0249129 A1 | 10/2009 | Femia |
| 2010/0165991 A1 * | 7/2010 | Veal ............... H04L 49/9094 370/392 |
| 2015/0205688 A1 | 7/2015 | Haid et al. |
| 2015/0263983 A1 | 9/2015 | Brennan et al. |
| 2016/0359621 A1 * | 12/2016 | Lin ............... H04L 9/32 |
| 2017/0324609 A1 | 11/2017 | Hong et al. |
| 2018/0046480 A1 | 2/2018 | Dong et al. |
| 2018/0143885 A1 | 5/2018 | Dong et al. |
| 2019/0045421 A1 * | 2/2019 | Shah ............... H04W 40/02 |
| 2019/0173850 A1 * | 6/2019 | Jain ............... H04L 9/088 |
| 2019/0246160 A1 * | 8/2019 | Williams ......... H04N 21/63345 |
| 2019/0306134 A1 * | 10/2019 | Shanbhogue ......... H04L 63/123 |
| 2019/0386969 A1 * | 12/2019 | Verzun ............. G06F 21/606 |
| 2020/0280584 A1 * | 9/2020 | Zhao ............... H04L 63/16 |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |
| 2022/0311701 A1 * | 9/2022 | Sung ............... H04L 45/44 |
| 2023/0185681 A1 | 6/2023 | Pawlowski et al. |
| 2023/0291721 A1 | 9/2023 | Robinson |
| 2024/0176739 A1 | 5/2024 | Alden et al. |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

SECURE IPv4 DATAGRAM 30

SECURE IPv4 DATAGRAM HEADER FORMAT & OPTIONAL HEADER

OPTIONAL HEADER FORMAT w/MCPHINT

FIG.4A

SECURE IPv6 DATAGRAM 40

| IP HEADER | EXT. HDR. | Ipsec (ESP) HEADER | ENCRYPTED DATAGRAM PAYLOAD |
|---|---|---|---|

FIG.4B

SECURE IPv6 DATAGRAM HEADER FORMAT, EXTENSION HEADER AND Ipsec HEADER

| VERSION | TRAFFIC CLASS | FLOW LABEL ||
|---|---|---|---|
| PAYLOAD LENGTH || NEXT HEADER | HOP LIMIT |
| SOURCE ADDRESS ||||
| DESTINATION ADDRESS ||||
| EXTENSION HEADER (OPTIONAL) ||||
| Ipsec Header (ESP) ||||

FIG.4C

EXTENSION HEADER PAYLOAD

| TYPE = IP6OPT_MCPHINT | LENGTH = 4 | DIFFERENTIATION DATA |
|---|---|---|

METHOD FOR DISTRIBUTING SECURE DATAGRAMS

FIELD OF THE INVENTION

The present disclosure relates to distributing IPsec datagrams to computational devices having multiple cores.

BACKGROUND

In order for computer applications to take advantage of the increasingly faster data transmission speeds over networks (i.e., 10 Gbit Ethernet), it is advantageous to design network computational devices (servers, routers, switches, etc.) that are capable of process network traffic at full line speed. The speed at which a computational device can operate is determined largely by the speed at which a central processing unit (CPU) can operate, and the speed at which a CPU can operate is limited primarily by its clock rate. CPUs designed with ever faster clock rates is one solution to the problem. Another solution is to design CPUs with multiple cores, and then balance the distribution of network traffic to each one of the multiple cores.

Typically, for the purpose of maintaining the order in which datagrams are received and in which they are processed, it is desirable to distribute a particular logical stream of datagrams to one particular core in a multi-core CPU comprising a destination device. Datagrams associated with a particular logical stream are identified by the combination of their source and destination IP addresses and port numbers. Generally, a destination device will perform a hash using the source and destination IP addresses and port numbers, and then use at least a portion of the resulting hash to determine to which core a datagram should be distributed. In this manner, all datagrams associated with the same logical stream are distributed in a deterministic manner to the same CPU core in a destination device.

BRIEF DESCRIPTION OF THE DRAWINGS

FIG. 4A is an illustration of the format of a secure IPv6 datagram 40.

FIG. 4B is an illustration of an IPv6 datagram header format, optional extension header and IPsec header.

FIG. 4C is an illustration of the optional extension header payload having the MCPHINT.

DETAILED DESCRIPTION

Figure 1:
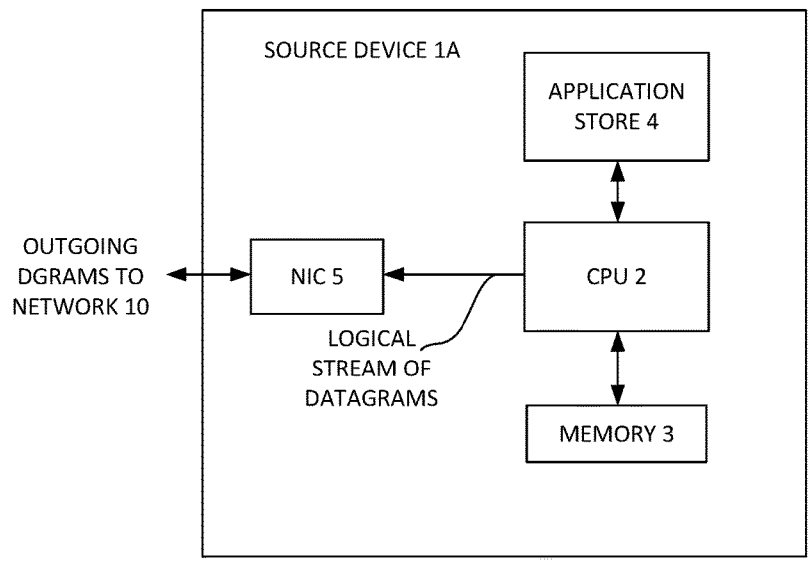
FIG. 1 is a functional block diagram showing a source device 1A connected over a network 10 to a destination device 1B.
Figure 1:
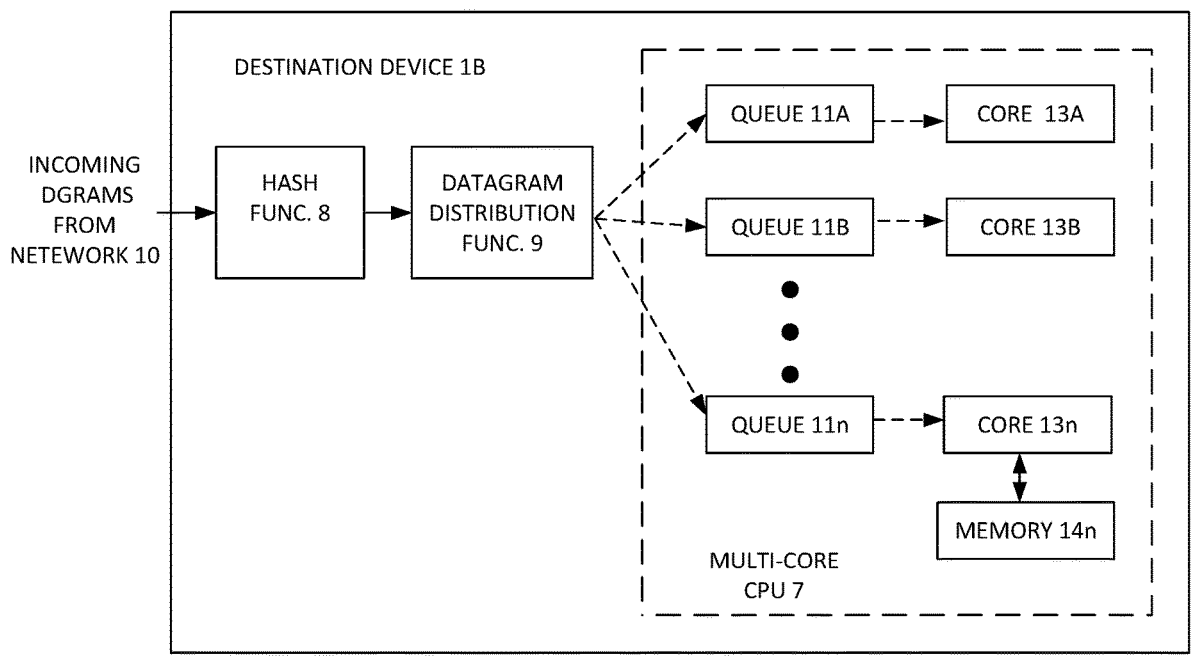

For various reasons, it is important to provide security for a logical stream of datagrams during the time that they are transmitted over a network. A secure network protocol suite (IPsec) was developed for the purpose of providing datagram security by authenticating and encrypting certain information comprising datagrams in a logical stream. IPsec can be employed to authenticate agents (source and destination devices), and to negotiate cryptographic keys for use during a time that the logical stream is active. Datagrams secured using Internet Protocol Security (IPsec) are referred to here as IPsec datagrams.

After being received by a destination device, unsecured datagrams comprising a particular logical stream of network traffic are distributed by the destination device using at least some information in a hash of a source and destination IP address and port number. However, in the event that a particular IPsec mechanism (i.e., encapsulated security payload or ESP) is employed to secure datagrams, port numbers reside in an encrypted portion of a datagram and are not available to hash with a source and destination IP address. Consequently, if a destination device having a multi-core CPU receives a stream of IPsec traffic, datagrams in different logical streams generated by the same source device tend to be distributed to the same core. Distributing IPsec datagrams in this manner can have the effect of overloading a core, slowing the processing of the datagrams delivered to the core, and thus slowing an application using the information in the datagrams processed by the core.

In order to prevent IPsec datagrams, associated with different logical streams generated by the same source device, from being distributed to the same CPU core in a multi-core CPU, I have added special datagram distribution information to an optional, unencrypted field of an IPv4 and IPv6 header. This special datagram distribution information is referred to herein as a MCPHINT, and this information in combination with a source and destination IP address uniquely identifies or differentiates one logical stream of datagrams generated by a source device from another logical stream of datagrams generated by the same source device. As the MCPHINT is added to an unencrypted portion of an IPsec datagram, the MCPHINT is immediately available for use by a destination device to determine how to distribute all IPsec datagrams comprising a particular logical stream to an CPU core in a multi-core CPU comprising a network computational device. By adding an MCPHINT to each IPsec datagram, the datagram distribution process running on a destination device is able to immediately perform load balancing upon receipt of an IPsec datagram, and the costly process of decrypting each IPsec datagram can be distributed among each core in a multi-core CPU, thereby increasing the speed at which incoming datagrams can be processed.

In operation, a destination device can examine an incoming IPsec datagram header, determine whether MCPHINT information is present, and then use this MCPHINT information in combination with a source and destination IP address as the basis for distributing the datagram. More specifically, when the MCPHINT information is present, the destination device detects the MCPHINT and uses the source and destination IP addresses in combination with data comprising the MCPHINT to generate a hash, and then this hash is used as the basis for distribution. Alternatively, the MCPHINT alone can be used as the basis for datagram distribution.

It should be understood, that different load balancing methodologies can be employed by a network device to distribute different logical streams of IPsec datagrams to a different CPU core in a multi-core C system, and it is not import to the operation of my invention what type of load balancing method is employed.

According to one embodiment, a source device can add a MCPHINT to an optional IPv4 header field of an IPsec datagram. The MCPHINT is added so that it is the first option in a secure IPv4 datagram header. This MCPHINT information is used by a destination device to distribute all datagrams comprising a particular stream to one particular core comprising a multi-core CPU.

According to another embodiment, the MCPHINT can be added to an optional extension header comprising a secure IPv6 datagram. This optional extension header is added to the datagram such that it is placed immediately after the IP header. This MCPHINT information is used by a destination device to distribute all datagrams comprising a particular stream to one particular core comprising a multi-core CPU.

According to another embodiment, a source and destination IP address is not used in a hash of the MCPHINT, but rather the MCPHINT is the sole basis for distributing datagrams associated a logical stream.

Referring now to the Figures, in which FIG. 1 is a functional block diagram of a source device 1A connected over a network 10 to a destination device 1B. The network 10 is not illustrated in any detail here, and among other things can be a LAN (i.e., Ethernet network), or it can be a WAN (i.e., Internet). Depending upon the network 10 configuration to which the two devices (1A and 1B) are connected, there can be intermediary devices between them, or there can be a direct connection between the devices 1A and 1B without any intermediary devices.

The devices 1A and 1B can be any type of networked computational device capable of generating and processing IP datagrams, such as network servers. The source device 1A has a multi-core or fast single-core CPU 2 (individual cores not shown), a memory 3, an application store 4, and a network interface controller (NIC) 5. The destination device 1B has a multi-core CPU 7 having cores labeled, Core 13A to Core 13n (with n being an integer number). Each core, 13A to 13n has an associated queue, 11A to 11n respectively, for maintaining incoming (or outgoing) datagrams, and each core can read/write data from/to an associated memory (only shown with reference to Core 13n). The destination device 1B can have a network interface controller (not shown) that operates to, among other things, receive datagrams from the network and convert information in the datagram into information that is useful to the destination device.

Continuing to refer to FIG. 1, the source device 1A generally supports applications that generate information placed in datagrams sent to the destination device 1B. More specifically, a core in the source device retrieves data in the memory 3 in support of the operation of one or more applications, and uses the information generated by the applications to generate one or more logical streams of IP datagrams that the NIC 5 transmits over the network 10 to the destination device 1B. The destination device 1B receives the logical streams of IP datagrams from the source device 1A (and from other source devices not shown), and can operate to distribute all IP datagrams associated with a first logical stream to a queue associated with a first CPU core, and to distribute IP datagrams associated with a second logical stream to a queue associated with a second CPU core, and so forth with other logical streams. Unsecured IP datagrams comprising a particular logical stream are generally distributed to a particular queue according to a hash of an IP source and destination address and source and destination port numbers. Depending upon the implementation, datagram distribution functionality can be implemented in either a network interface card or in an operating system associated with a CPU. It is not important to the operation of this invention how a destination device is configured to implement datagram distribution functionality. However, in the case that IP datagrams are secured by IPsec, port numbers are included in an encrypted portion of the IPsec datagram, and so are not available to the datagram distribution functionality 9 in order to generate a hash. In this case, only an IP source and destination address is available to distribute IPsec datagrams, and this can result in some or all datagrams from different logical streams being distributed to the same queue, which tends to overload and slow the operation of a core associated with that queue.

Figure 2:
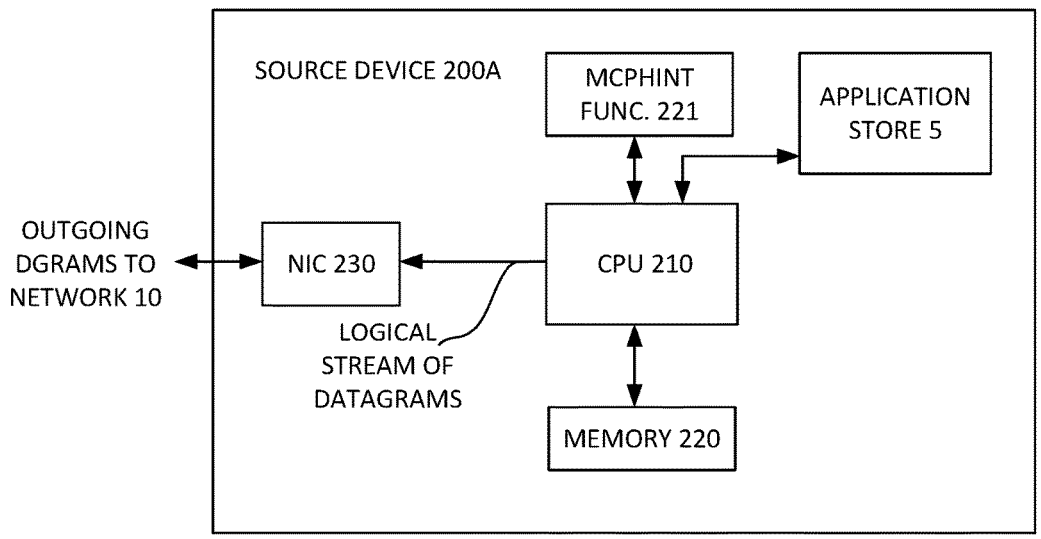
FIG. 2 is a functional block diagram showing a source device 200A, with a MCPHINT generation function 221, connected over a network 10 to a destination device 200B.
Figure 2:
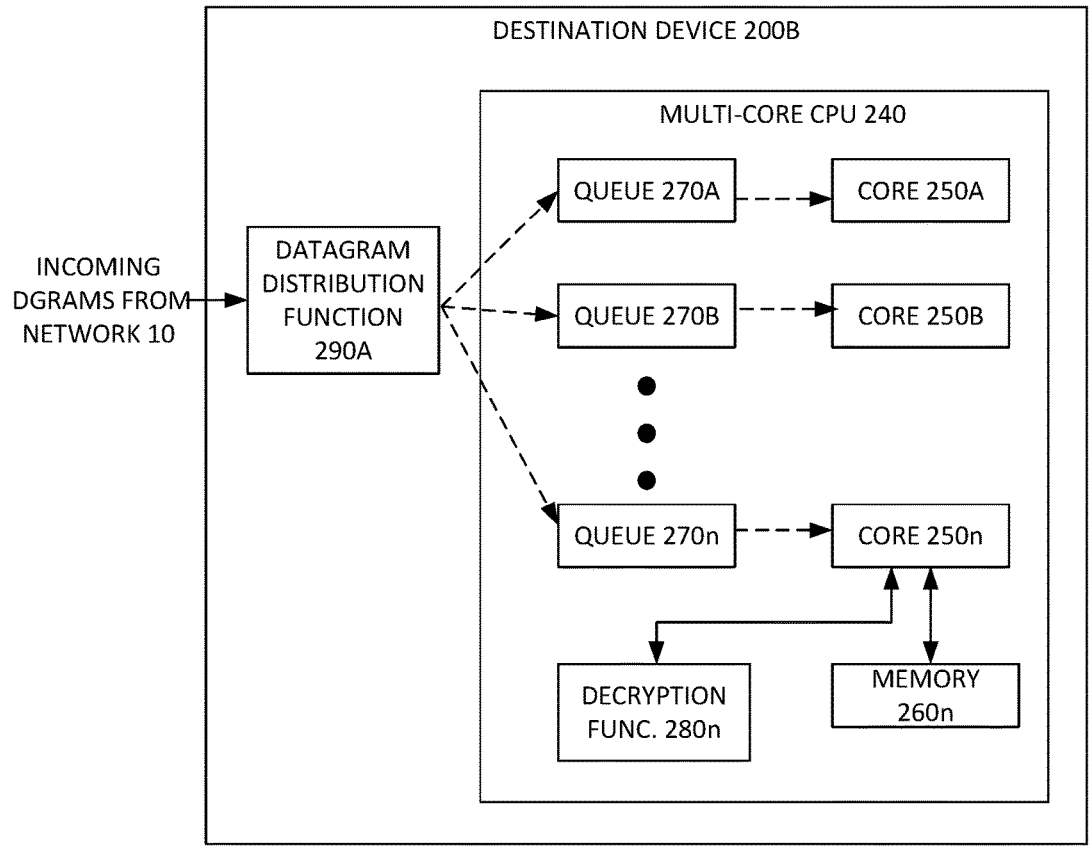

FIG. 2 illustrates functionality comprising a source device 200A and a destination device 200B, both of which have functionality similar to the source and destination devices 1A and 1B described earlier with reference to FIG. 1. However, the source device 200A has additional functionality that operates to generate special datagram distribution information that is placed into an unencrypted portion of a datagram. This distribution information is referred to here as a HCPHINT. The CPU 210 can operate to place a MCPHINT, generated by an MCPHINT generation function 221, into an unencrypted field of an IPsec datagram. According to one embodiment, the MCPHINT can be placed into an optional header field comprising a secure IPv4 datagram, and according to another embodiment, the MCPHINT can be placed into an optional extension header comprising an IPv6 datagram. In both embodiments, the MCPHINT is comprised of one (1) byte of Type information, one (1) byte of Length information, and two (2) bytes of Differentiation Data. The Differentiation Data comprising the MCPHINT is random data, is not zero, and is the same for all datagrams comprising a logical stream of datagrams during the life of the stream. The Differentiation Data can be generated using a random number generator, or by exclusive OR'ing source and destination port numbers. Further, the Differentiation Data should be updated every time a new connection is established between a source and destination device.

Continuing to refer to FIG. 2, the destination device 200B has, among other things, a multi-core CPU 240 which is comprised of a plurality of queues, Queue 270A to 270n, each of which are associated with a core, labeled Core 250A to 250n respectively. Each one of the cores has access to memory, such as memory 260n shown associated with the core 250n. And each core can run a decryption function 280n. In operation, the destination device 200B can receive a logical stream of secure IP datagrams from the source device 200A, examine an unencrypted portion of each datagram in the stream for MCPHINT information (i.e., differentiation data) and source and destination IP address information, generate a hash of the address and MCPHINT information, and then use the resulting hash as the basis to distribute all of the datagrams in the logical stream to one of the queues, which can be for example the queue labeled 270A. It is not important to the operation of this invention that the device 200B knows to which queue a logical stream is distributed before receiving a first datagram in a logical stream. The queue assignment can be determined by an implementation of any well-known load balancing function subsequent to the destination device detecting a MCPHINT.

An advantage in using this datagram distribution methodology, is that the MCPHINT information comprises an unencrypted portion of a datagram that the destination device 200B can immediately use to distribute the IPsec datagram to a particular core in a multi-core CPU without the need to first decrypt the datagram.

Figure 3A:
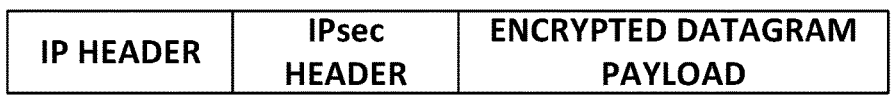
FIG. 3A is an illustration of the format of a secure IPv4 datagram 30.
Figure 3B:
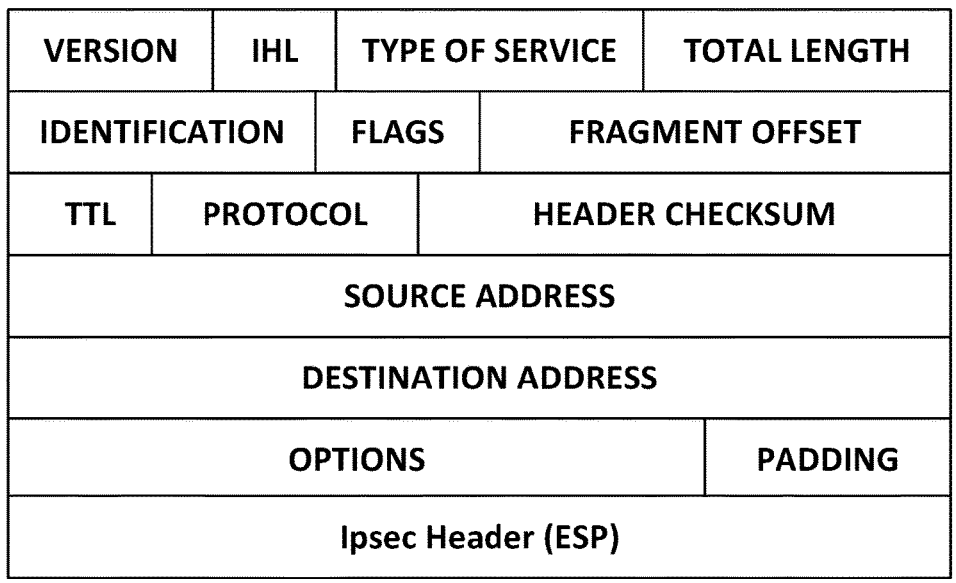
FIG. 3B is an illustration of an IPv4 datagram header format having an optional header.
Figure 3C:
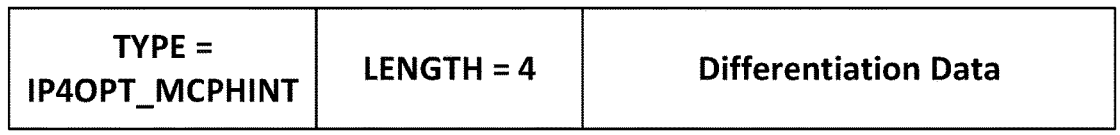
FIG. 3C is an illustration of an optional header format having the MCPHINT.

FIGS. 3A, 3B and 3C illustrate the general format that a secure IPv4 datagram using the ESP security mechanism. FIG. 3A is a high-level illustration of a secure IPv4 datagram 30 showing a main IP header, an IPsec (ESP) header, and the following encrypted datagram payload. As previously described, a port number is located in this encrypted payload information, and so is not immediately available to a destination device, device 200B for example, to use for distributing the datagram.

FIG. 3B illustrates a secure IPv4 datagram header format having an options field in which the MCPHINT can be placed. In the case that an MCPHINT is used, it should be placed at offset twenty (20) from the beginning of an IPv4 header.

According to one embodiment, FIG. 3C illustrates the format for a MCPHINT in the Options field of the IPv4 header. The MCPHINT is comprised of one (1) byte of type information (IP4OPT_MCPHINT), one (1) byte of length information, and two (2) bytes of differentiation data. As previously described with reference to FIG. 2, the MCPHINT function 221 can generate the differentiation data using, among other things, a random number generator or by exclusive OR'ing the source and destination port numbers. In operation, the destination device CPU, CPU 240 for example, operates on each datagram it receives to examine the IP header IHL field to, among other things, determine whether the IP header has an Options field (CPU detects that IHL is ≥6, i.e., six, thirty-two-bit words), and that the byte at offset 20 is IP4OPT_MCPHINT. If the CPU determines that these two conditions are met, the CPU can then examine the differentiation data, and use this information in combination with IP source and destination address information to unambiguously identify which logical stream the datagram is associated with, and distribute the datagram to an appropriate queue for processing.

FIGS. 4A, 4B and 4C together illustrate a general format a secure IPv6 datagram using the ESP security mechanism. FIG. 4A is a high-level illustration of an IPv6 datagram 40 showing a main IP header, an optional extension header, an IPsec ESP header, and the following encrypted datagram payload. As previously described, a port number is located in this encrypted payload information, and so is not immediately available to a destination device, device 200B for example, to use when distributing the datagram.

FIG. 4B illustrates a secure IPv6 datagram having a main IP header, an extension header and IPsec header (i.e., ESP header). In the case that the NEXT HEADER field indicates that the datagram has an optional extension header (i.e., Hop-by-Hop or Destination Options header), then a MCPHINT should be placed first in the Hop-by-Hop header as shown with reference to FIG. 4C. The MCPHINT must be placed first in the Hop-by-Hop header at offset forty-two (42) from the beginning of the IPv6 header. Placing the MCPHINT at this position in the first extension header (and therefor prior to the ESP header) ensures that the MCPHINT will not be in the encrypted portion of the datagram, and therefore immediately available to a destination device to use for distributing the datagram.

FIG. 4C illustrates the format for the MCPHINT in a payload portion of an optional extension header (i.e., hop-by-hop). The MCPHINT is comprised of one (1) byte of Type information (IP6OPT_MCPHINT), one (1) byte of Length information (4), and two (2) bytes of differentiation data. In operation, the destination device CPU 200B operates on each IPsec datagram it receives and examines the IP header IHL field to, among other things, determine whether the IP header has an Options field (CPU detects that Next Header=Zero for Hop-by-Hop, and the byte at offset 42=IP6OPT_MCPHINT. If the CPU determines that these two conditions are met, the CPU can then examine the differentiation data, and use this information in combination with an IP source and destination address to unambiguously identify which logical stream the datagram is associated with, and distribute the datagram to an appropriate queue for processing.

While the above embodiments are described in the context of an IPsec datagram employing the ESP mechanism, for various reasons it can be desirable to employ more than one security mechanism in each IPsec packet. In this case, the ESP security mechanism can placed in an IPsec packet subsequent to an Authentication Header (AH) security mechanism.

The forgoing description, for purposes of explanation, used specific nomenclature to provide a thorough understanding of the invention. However, it will be apparent to one skilled in the art that some specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method for distributing a logical stream of secure datagrams to a central processing unit (CPU) core of a multi-core CPU, comprising:
   generating, at a source computational device, a logical stream of secure datagrams, and adding a Multiple Core Performance Hint (MCPHINT) to an unencrypted portion of each secure datagram comprising the logical stream, wherein MCPHINT comprises unencrypted distribution information, wherein the unencrypted distribution information is configured to distribute one or more secure datagrams to the CPU core, wherein the MCPHINT is information used by a destination computational device to distribute all datagrams comprising a particular stream to one particular core comprising a multi-core CPU without the need to first decrypt the datagrams;
   transmitting the logical stream of secure datagrams over a network connection to the destination computational device;
   receiving, at the destination computational device, the logical stream of secure datagrams, and detecting a source IP address, a destination IP address and the MCPHINT in each one of the secure datagrams;
   generating, for each secure datagram comprising the logical stream, a hash of the source IP address, destination IP address and at least some information comprising the MCPHINT, and
   using the hash as a basis for distributing each secure datagram comprising the logical stream to the CPU core.

2. The method of claim 1, wherein the secure datagrams are comprised of an encapsulating security payload mechanism.

3. The method of claim 1, wherein the MCPHINT is added to an optional header field comprising each secure datagram.

4. The method of claim 3, wherein each secure datagram is an IPv4 datagram.

5. The method of claim 3, wherein the MCPHINT is a first option added to the secure IPv4 datagram header.

6. The method of claim 1, wherein the MCPHINT is comprised of randomly generated differentiation data.

7. The method of claim 1, wherein the MCPHINT is added to an unencrypted, optional extension header in a secure IPv6 datagram.

8. The method of claim 1, wherein the MCPHINT is added to each datagram in the logical stream.

9. The method of claim 1, wherein the information comprising the MCPHINT is the same for each one of the secure datagrams in the logical stream.

10. A method for distributing a logical stream of Internet Protocol Security (IPsec) datagrams to a central processing unit (CPU) core of a multi-core CPU, comprising:
  generating, at a source computational device, a logical stream of IPsec datagrams, and adding a Multiple Core Performance Hint (MCPHINT) to an unencrypted portion of each IPsec datagram comprising the logical stream, wherein the MCPHINT is information used by a destination device to distribute all datagrams comprising a particular stream to one particular core of a multi-core central processing unit without the need to first decrypt the datagrams, wherein MCPHINT comprises unencrypted distribution information, wherein the unencrypted distribution information is configured to distribute one or more IPsec datagrams to the CPU core;
  transmitting the logical stream of IPsec datagrams over a network connection to a destination computational device;
  receiving, at the destination computational device, the logical stream of IPsec datagrams, and detecting a source IP address, a destination IP address and the MCPHINT in each one of the IPsec datagrams;
  generating, for each IPsec datagram comprising the logical stream, a hash of the source IP address, destination IP address and at least some information comprising the MCPHINT, and
  using the hash as a basis for distributing each IPsec datagram comprising the logical stream to the CPU core.

11. The method of claim 10, wherein the Ipsec datagrams are comprised of an encapsulating security payload mechanism.

12. The method of claim 10, wherein the MCPHINT is added to an optional header field comprising each IPsec datagram.

13. The method of claim 12, wherein each IPsec datagram is an IPv4 datagram.

14. The method of claim 13, wherein the MCPHINT is a first option added to the secure IPv4 datagram header.

15. The method of claim 10 wherein the MCPHINT is comprised of randomly generated differentiation data.

16. The method of claim 10, wherein the MCPHINT is added to an unencrypted, optional extension header in a secure IPv6 datagram.

17. The method of claim 10, wherein the MCPHINT is added to each IPsec datagram in the logical stream.

18. The method of claim 10, wherein the information comprising the MCPHINT is the same for each one of the IPsec datagrams in the logical stream.

* * * * *